United States Patent
Sudharsanan et al.

(10) Patent No.: US 6,671,796 B1
(45) Date of Patent: Dec. 30, 2003

(54) CONVERTING AN ARBITRARY FIXED POINT VALUE TO A FLOATING POINT VALUE

(75) Inventors: Subramania Sudharsanan, Union City, CA (US); Jeffrey Meng Wah Chan, Mountain View, CA (US); Michael F. Deering, Los Altos, CA (US); Marc Tremblay, Palo Alto, CA (US); Scott R. Nelson, Pleasanton, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 09/513,494

(22) Filed: Feb. 25, 2000

(51) Int. Cl.$^7$ .................. G06F 9/302; G06F 9/315; G06F 7/38
(52) U.S. Cl. ............ 712/222; 712/221; 712/227; 708/204; 708/205; 708/495
(58) Field of Search ............. 708/501, 523, 708/204, 205, 495, 502; 712/221, 222, 227, 22, 4, 25

(56) References Cited

U.S. PATENT DOCUMENTS

| 4,150,434 A | * | 4/1979 | Shibayama et al. ......... 708/523 |
| 4,511,990 A | * | 4/1985 | Hagiwara et al. ........... 708/501 |
| 6,480,872 B1 | * | 11/2002 | Choquette ................... 708/501 |

* cited by examiner

*Primary Examiner*—Daniel H. Pan
(74) *Attorney, Agent, or Firm*—Zagorin, O'Brien & Graham, LLP (57) ABSTRACT

A method and apparatus are provided for performing efficient conversion operations between floating point and fixed point values on a general purpose processor. This is achieved by providing an instruction for converting a fixed point value fx into a floating point value fl in a general purpose processor. Accordingly, the invention advantageously provides a general purpose processor with the ability to execute conversion operation between fixed-point and floating-point values with a single instruction compared with prior art general purpose processors that require multiple instructions to perform the same function. Thus, the general purpose processor of the present invention allows for more efficient and faster conversion operations between fixed-point and floating-point values.

27 Claims, 5 Drawing Sheets

| OPCODE | RD | RS1 | RS2 |
|---|---|---|---|
| OPCODE | RD | RS1 | immediate |

FIG. 3A

| 0 0 1 0 0 1 1 0 1 0 0 | RD | RS1 | RS2 |
|---|---|---|---|

FIG. 3B

| 0 0 1 0 1 1 1 0 1 0 0 | RD | RS1 | immediate |
|---|---|---|---|

CONVERTING AN ARBITRARY FIXED POINT VALUE TO A FLOATING POINT VALUE

BACKGROUND OF THE INVENTION

1. Field of the Invention

The present invention relates generally to processors and, more particularly, to instructions for use with processors.

2. Related Art

Current processors support mathematical operations on real numbers, using either fixed point or floating point representations. Floating point values are typically represented in binary format as an exponent and a mantissa. The exponent represents a power to which a base number such as 2 is raised and the mantissa is a number to be multiplied by the base number. Accordingly, the actual number represented by a floating point value is the mantissa multiplied by a quantity equal to the base number raised to a power specified by the exponent. In such a manner, any particular number may be approximated in floating point notation as $fxB^e$ or $(f,e)$ where f is an n-digit signed mantissa, e is an m-digit signed integer exponent and B is the base number system. In most computer systems, the base number system used is the binary number system where B=2, although some systems use the decimal number system (B=10) or the hexadecimal number system (B=16) as their base number system. Floating point values may be added, subtracted, multiplied, or divided and computing structures for performing these arithmetic operations on binary floating point values are well known in the art.

Fixed point values, by contrast, are made up of an integer followed by a fraction. The number of digits used for the integer and the fractional parts of the fixed point value can be varied, even though, for convenience, the total number of bits typically remains constant. As a result, multiple formats for representing a fixed point value can be supported by a microprocessor by simply varying the number of bits used for the integer and the fractional parts.

Similarly, a series of floating point formats exist which represent different trade offs between the precision and range of numbers (largest to smallest) representable, storage requirements, and cycles required for computing arithmetic results. In general, longer formats trade increased storage requirements and decreased speed of arithmetic operations (mainly multiplication and division operations) for greater precision and available range.

Figure 5:
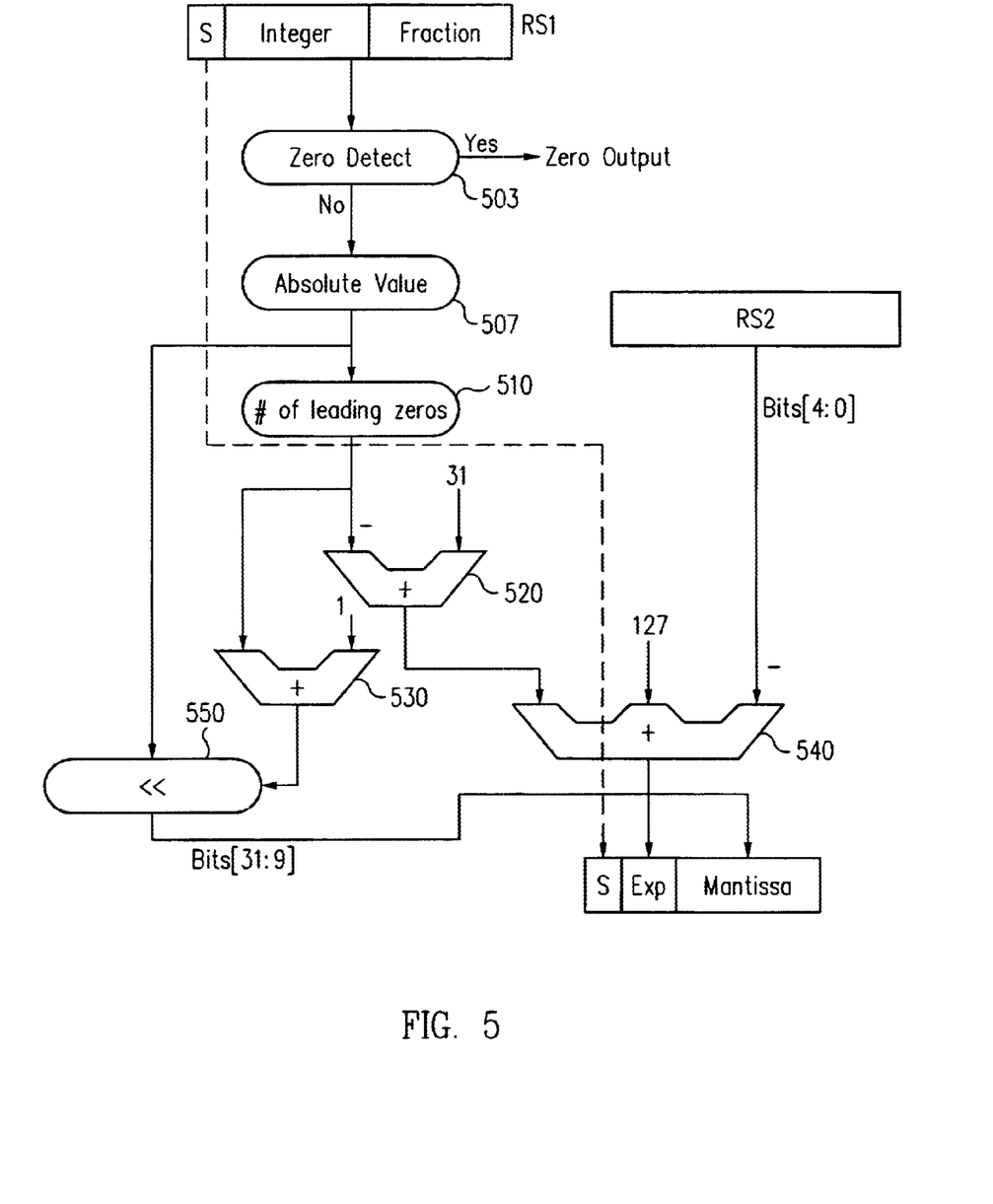
FIG. 5 is a block diagram of an implementation of the circuitry within MFUs 222 of the processor of FIG. 1B for performing the fix2flt instruction of FIG. 3B.

ANSI IEEE Standard 754 defines several floating point formats including single-precision, double-precision, and extended double-precision. Referring to FIG. 5, the format of a 32-bit single precision floating point value is broken into a one-bit sign field "s," an eight-bit biased exponent field "exp," a so called "hidden" bit (which although not explicitly represented, is assumed to be a one just left of the implied binary point), and a 23-bit "mantissa."

Both floating point and fixed point values are typically used on current microprocessors. On general-purpose processors, translations between fixed and floating point values are typically performed in software, thereby requiring multiple instructions to be executed by the processor in order to perform a single translation. Conversion from fixed point to floating point datatypes are needed for several reasons. Fixed point basic arithmetic operations are simpler and usually have a smaller latency than floating point operations. Floating point datatypes, on the other hand, generally cover a wide range of values and dynamically adjust to maintain the most significant bits of the results. Acquired signals from external devices such as visual and auditory data in general use fixed point representations. Floating point computations on these data are sometimes preferred.

SUMMARY OF THE INVENTION

The present invention provides a method and apparatus for efficient conversion operations between floating point and fixed point values to be performed in a general purpose processor. This is achieved by providing an instruction for converting an arbitrary fixed point value fx into a floating point value fl in a general purpose processor.

Accordingly, the invention advantageously provides a general purpose processor with the ability to execute conversion operation between arbitrary fixed-point and floating-point values with a single instruction compared with prior art general purpose processors that require multiple instructions to perform the same function. Thus, the general purpose processor of the present invention allows for more efficient and faster conversion operations between fixed-point and floating-point values.

DETAILED DESCRIPTION OF THE INVENTION

Figure 1A:
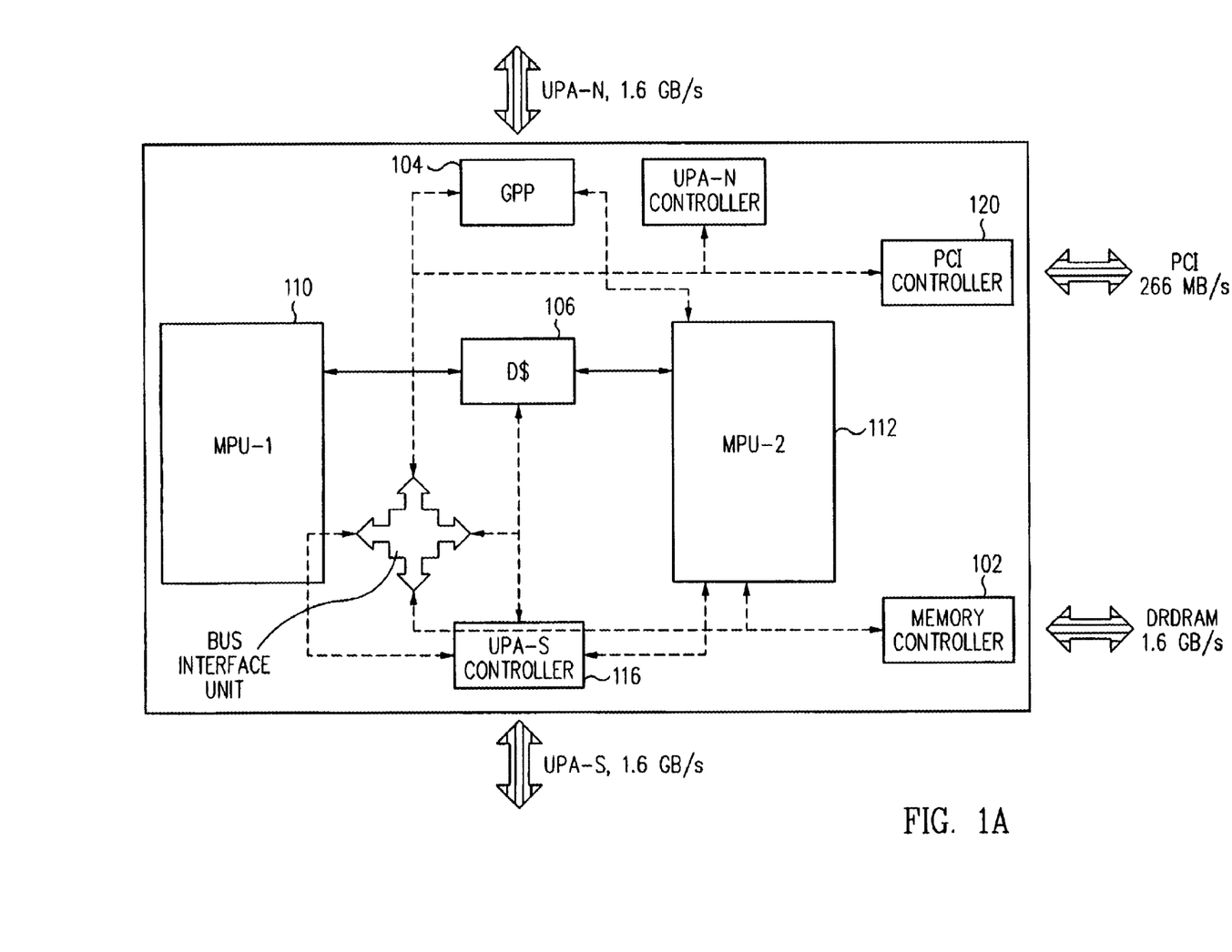
FIG. 1A is a schematic block diagram illustrating a single integrated circuit chip implementation of a processor in accordance with an embodiment of the present invention.

A processor in accordance to the principles of the present invention is illustrated in FIG. 1.

Referring to FIG. 1A, a schematic block diagram illustrates a single integrated circuit chip implementation of a processor 100 that includes a memory interface 102, a geometry decompressor 104, two media processing units 110 and 112, a shared data cache 106, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels to manage multiple high-bandwidth data streams efficiently and with a low response time. The interface controllers include a an UltraPort Architecture Interconnect (UPA) controller 116 and a peripheral component interconnect (PCI) controller 120. The illustrative memory interface 102 is a direct Rambus dynamic RAM (DRDRAM) controller. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112. The UPA controller 116 provides a high speed interconnect 64-bit wide bus at 200 Mhz.

Two media processing units 110 and 112 are included in a single integrated circuit chip to support an execution environment exploiting thread level parallelism in which two independent threads can execute simultaneously. The threads may arise from any sources such as the same application, different applications, the operating system, or the runtime environment. Parallelism is exploited at the thread level since parallelism is rare beyond four, or even two, instructions per cycle in general purpose code. For example, the illustrative processor 100 is an eight-wide machine with eight execution units for executing instructions. A typical "general-purpose" processing code has an instruction level parallelism of about two so that, on average, most (about six) of the eight execution units would be idle at any time. The illustrative processor 100 employs thread level parallelism and operates on two independent threads, possibly attaining twice the performance of a processor having the same resources and clock rate but utilizing traditional non-thread parallelism.

Although the processor 100 shown in FIG. 1A includes two processing units on an integrated circuit chip, the architecture is highly scaleable so that one to several closely-coupled processors may be formed in a message-based coherent architecture and resident on the same die to process multiple threads of execution. Thus, in the processor 100, a limitation on the number of processors formed on a single die thus arises from capacity constraints of integrated circuit technology rather than from architectural constraints relating to the interactions and interconnections between processors.

Figure 1B:
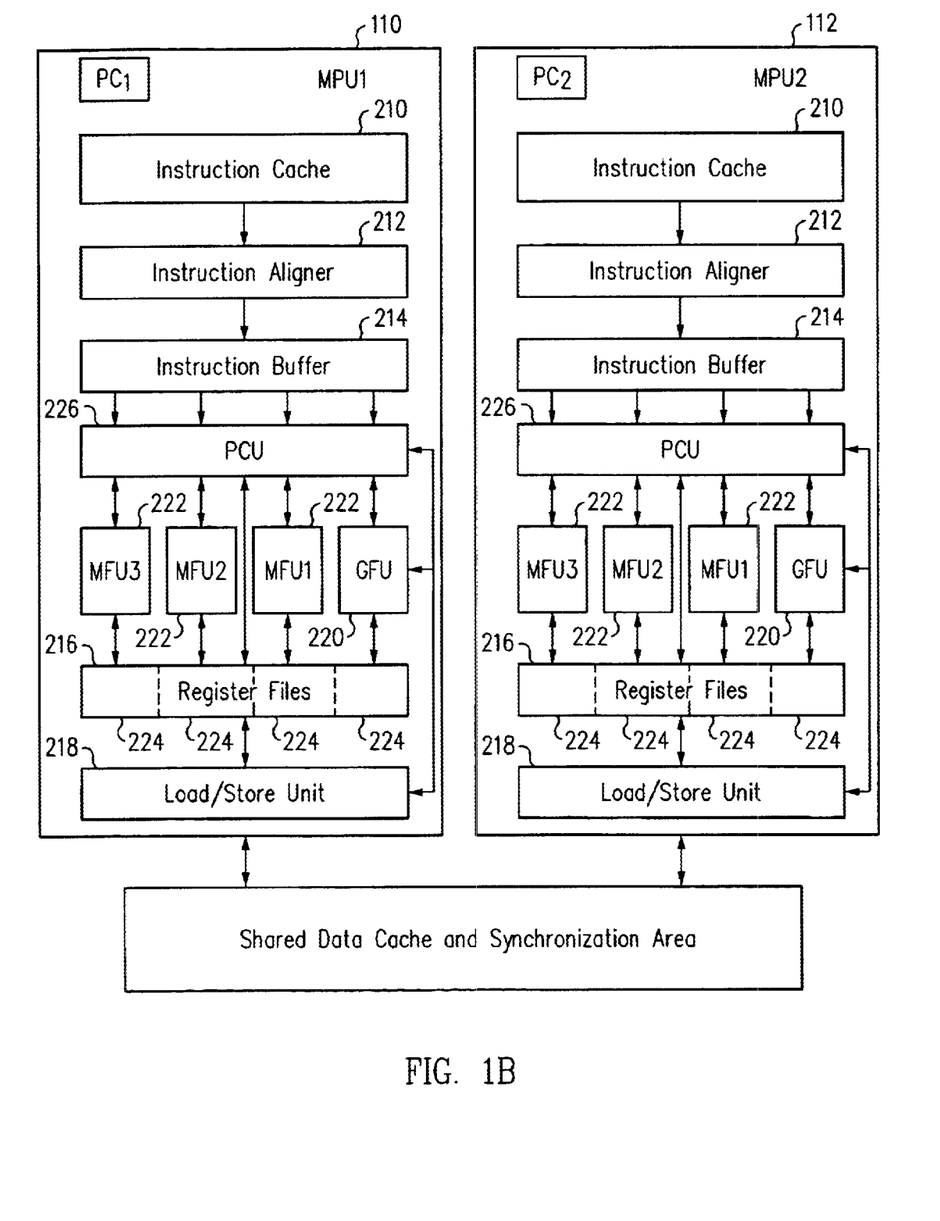
FIG. 1B is a schematic block diagram showing the core of the processor.

Referring to FIG. 1B, a schematic block diagram shows the core of the processor 100. The media processing units 110 and 112 each include an instruction cache 210, an instruction aligner 212, an instruction buffer 214, a pipeline control unit 226, a split register file 216, a plurality of execution units, and a load/store unit 218. In the illustrative processor 100, the media processing units 110 and 112 use a plurality of execution units for executing instructions. The execution units for a media processing unit 110 include three media functional units (MFU) 222 and one general functional unit (GFU) 220. The media functional units 222 are multiple single-instruction-multiple-data (MSIMD) media functional units. Each of the media functional units 222 is capable of processing parallel 16-bit components. Various parallel 16-bit operations supply the single-instruction-multiple-data capability for the processor 100 including add, multiply-add, shift, compare, and the like. The media functional units 222 operate in combination as tightly-coupled digital signal processors (DSPs). Each media functional unit 222 has a separate and individual sub-instruction stream, but all three media functional units 222 execute synchronously so that the subinstructions progress lock-step through pipeline stages.

The general functional unit 220 is a RISC processor capable of executing arithmetic logic unit (ALU) operations, loads and stores, branches, and various specialized and esoteric functions such as parallel power operations, reciprocal squareroot operations, and many others. The general functional unit 220 supports less common parallel operations such as the parallel reciprocal square root instruction.

The illustrative instruction cache 210 has a 16 Kbyte capacity and includes hardware support to maintain coherence, allowing dynamic optimizations through self-modifying code. Software is used to indicate that the instruction storage is being modified when modifications occur. The 16 K capacity is suitable for performing graphic loops, other multimedia tasks or processes, and general-purpose Java™ code. Coherency is maintained by hardware that supports write-through, non-allocating caching. Self-modifying code is supported through explicit use of "store-to-instruction-space" instructions store2i. Software uses the store2i instruction to maintain coherency with the instruction cache 210 so that the instruction caches 210 do not have to be snooped on every single store operation issued by the media processing unit 110.

The pipeline control unit 226 is connected between the instruction buffer 214 and the functional units and schedules the transfer of instructions to the functional units. The pipeline control unit 226 also receives status signals from the functional units and the load/store unit 218 and uses the status signals to perform several control functions. The pipeline control unit 226 maintains a scoreboard, generates stalls and bypass controls. The pipeline control unit 226 also generates traps and maintains special registers.

Each media processing unit 110 and 112 has a register set of up to 224 logical thirty-two bit registers.

The media processing units 110 and 112 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach that avoids hardware interlocks to account for software that does not schedule operations properly. Such hardware interlocks are typically complex, error-prone, and create multiple critical paths. A VLIW instruction word always includes one instruction that executes in the general functional unit (GFU) 220 and from zero to three instructions that execute in the media functional units (MFU) 222. A MFU instruction field within the VLIW instruction word includes an operation code (opcode) field, two or three source register (or immediate) fields, and one destination register field.

Instructions are executed in-order in the processor 100 but loads can finish out-of-order with respect to other instructions and with respect to other loads, allowing loads to be moved up in the instruction stream so that data can be streamed from main memory. The execution model eliminates the usage and overhead resources of an instruction window, reservation stations, a re-order buffer, or other blocks for handling instruction ordering. Elimination of the instruction ordering structures and overhead resources is highly advantageous since the eliminated blocks typically consume a large portion of an integrated circuit die. For example, the eliminated blocks consume about 30% of the die area of a Pentium II processor.

The processor 100 supports full bypasses between the first two execution units within the media processing unit 110 and 112 and has a scoreboard in the general functional unit 220 for load operations so that the compiler does not need to handle nondeterministic latencies due to cache misses. The processor 100 scoreboards long latency operations that are executed in the general functional unit 220, for example a reciprocal square-root operation, to simplify scheduling across execution units. The scoreboard (not shown) operates by tracking a record of an instruction packet or group from the time the instruction enters a functional unit until the instruction is finished and the result becomes available. A VLIW instruction packet contains one GFU instruction and from zero to three MFU instructions. The source and destination registers of all instructions in an incoming VLIW instruction packet are checked against the scoreboard. Any true dependencies or output dependencies stall the entire packet until the result is ready. Use of a scoreboarded result as an operand causes instruction issue to stall for a sufficient number of cycles to allow the result to become available. If the referencing instruction that provokes the stall executes on the general functional unit 220 or the first media functional unit 222, then the stall only endures until the result is available for intra-unit bypass. For the case of a load instruction that hits in the data cache 106, the stall may last only one cycle. If the referencing instruction is on the second or third media functional units 222, then the stall endures for one extra cycle to allow time for transmission.

The scoreboard automatically manages load delays that occur during a load hit. In an illustrative embodiment, all loads enter the scoreboard to simplify software scheduling and eliminate NOPs in the instruction stream.

The scoreboard is used to manage most interlocks between the general functional unit 220 and the media functional units 222. All loads and non-pipelined long-latency operations of the general functional unit 220 are scoreboarded. The long-latency operations include division idiv, fdiv instructions, reciprocal squareroot frecsqrt, precsqrt instructions, and power ppower instructions. None of the results of the media functional units 222 is scoreboarded. Non-scoreboarded results are available to subsequent operations on the functional unit that produces the results following the latency of the instruction.

Figure 2A:
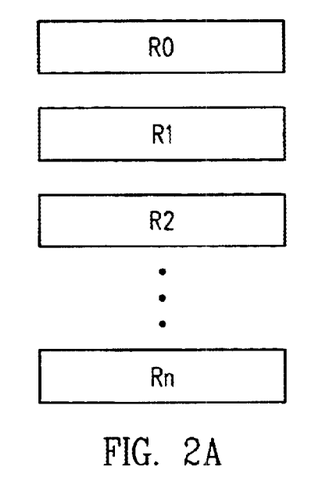
FIG. 2A is a block diagram of a register file of a processor, according to the invention.
Figure 2B:
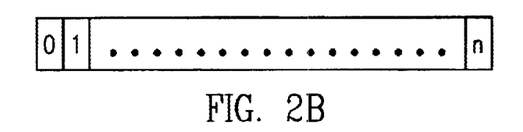
FIG. 2B is a block diagram of a register of the register file of the processor of FIG. 1B.

The structure of a register file of the processor of FIG. 1B is illustrated in FIG. 2A. The register file is made up of an arbitrary number of registers R0, R1, R2 . . . Rn. Each of registers R0, R1, R2 . . . Rn, in turn has an arbitrary number of bits n, as shown in FIG. 2B. In one embodiment, the number of bits in each of registers R0, R1, R2 . . . Rn is 32. However, those skilled in the art realize that the principles of the present invention can be applied to an arbitrary number of registers each having an arbitrary number of bits. Accordingly, the present invention is not limited to any particular number of registers or bits per register.

Figure 3A:
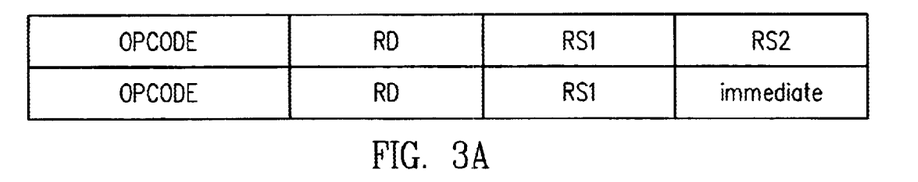
FIG. 3A is a block diagram showing instruction formats for three-operand instructions supported by the processor of FIG. 1B.

FIG. 3A illustrates two instruction formats for three-operand instructions supported by the processor of FIG. 1B. Each instruction format has an 11-bit opcode and three 7-bit operands. Bit 6 of the opcode indicates whether the third operand is a source register or an immediate value. The first of the operands is a reference to a destination register (RD) for the instruction. The second operand, in turn, is a reference to a first source register for the instruction (RS1). Finally, the third operand can be a reference to a second (RS2) source register or an immediate value to be used in the instruction.

Figure 3B:
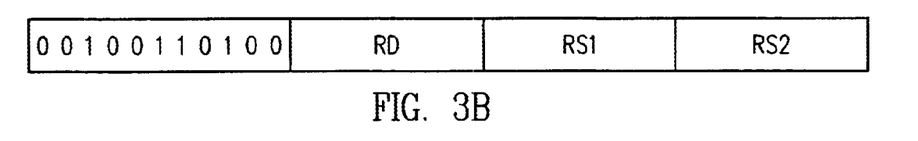
FIGS. 3B and 3C are block diagrams showing an instruction formats for a fix2flt instruction supported by the processor of FIG. 1B.
Figure 3C:
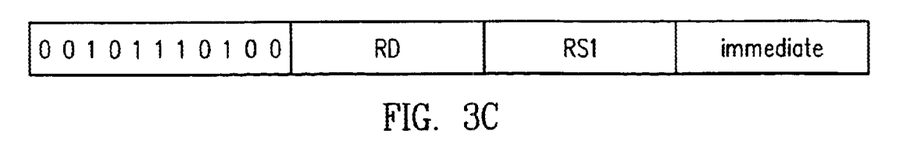

FIG. 3B illustrates an instruction format for a converting a fixed point value to a floating point value (fix2flt) supported by the processor of FIG. 1B, in accordance to the present invention. The fix2flt instruction uses either of the three-operand instruction formats of FIG. 3A, as shown in FIGS. 3B and 3C. The RD operand represents a register of the register file in which the results of the fix2flt instruction are stored. The RS1 operand represents the register of the register file from which the fixed point value to be converted is read. The RS2 operand represents the register of the register file in which the position of the point in the fixed point value of operand RS1 is specified.

Figure 4A:
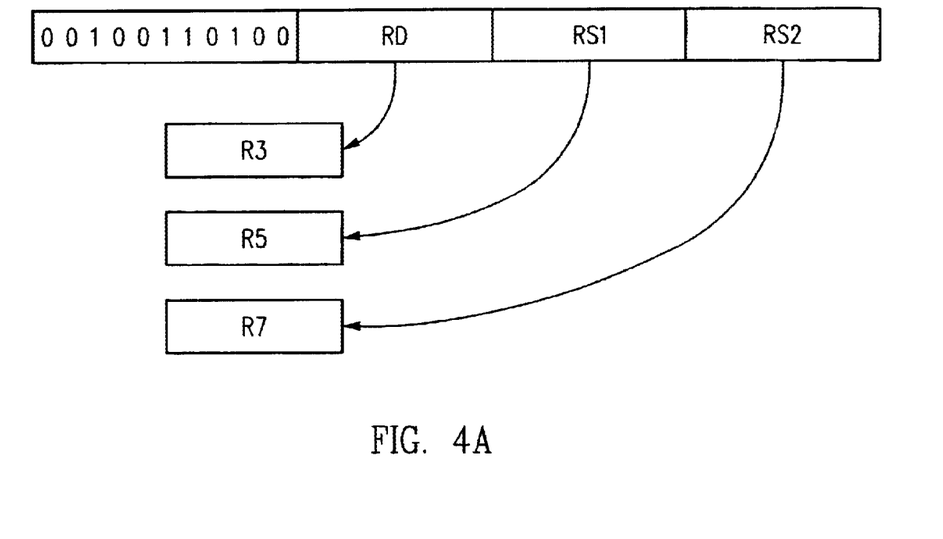
FIGS. 4A and 4B are block diagrams showing the respective relationships between the instruction formats of FIGS. 3B and 3C and the register file of FIG. 2A.
Figure 4B:
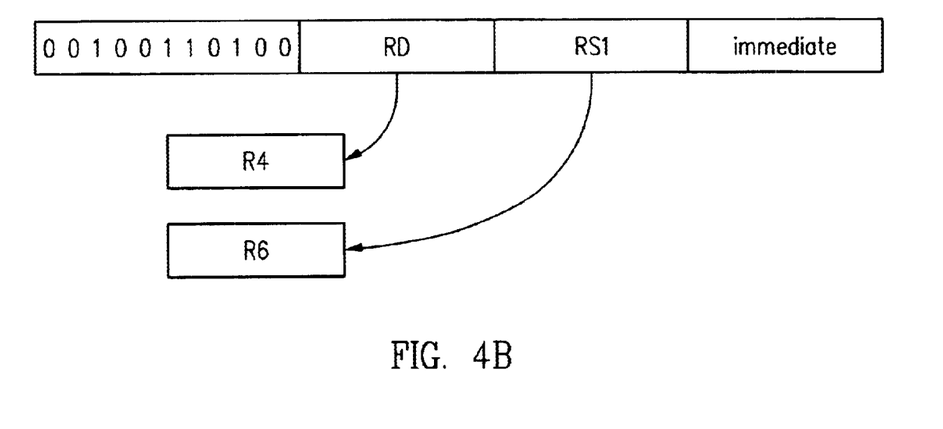

In the fix2flt instruction of FIG. 3B, all operands are references to registers in the register file of the processor, as shown in FIG. 4A. In the fix2flt instruction of FIG. 3C, all operands are references to registers in the register file of the processor except for the last operand which is an immediate value, as shown in FIG. 4B. Each of the operands of the fix2flt instruction refers to an arbitrary register in the register file. For example, the operand RD contains a reference to the R3 register, the operand RS1 contains a reference to the R5 register and the operand RS2 contains a reference to the R7 register.

FIG. 5 is a block diagram that illustrates the operation of the fix2flt instruction of FIG. 3B. The fix2flt instruction converts a fixed point value stored in register RS1 into an IEEE single precision floating point value and stores the floating point value in register RD. Thus, the value stored in register RD represents a floating point value that is equivalent to the fixed point value stored in register RS1. The location of the point p in the fixed point value stored in register RS1 is, in turn, stored in bits 0–4 of register RS2. Those skilled in the art realize that the number of bits used to represent position of the point in register RS2 can be varied depending on the size of the register. In addition, while the point position is stored in bits 0–4 of register RS2, such choice is arbitrary and the invention is not limited to any particular location of the point position within register RS2.

By allowing the point position to be specified as part of the instruction, the fix2flt instruction supports a wide range of fixed point formats. The operation of the fix2flt instruction of FIG. 3C is analogous to the operation of the fix2flt instruction of FIG. 3B except that the position of the point p is supplied as an immediate values specified by the instruction rather than being stored in register RS2.

As shown in FIG. 5, fixed point value fx stored in register RS1 is routed to a zero detect circuit 503. Zero detect circuit 503 determines whether fx is a zero value, in which case a zero is output. Otherwise, fx is routed to absolute value circuit 507. Absolute value circuit 507 receives value fx and generates an absolute value for fx, that is in turn routed to a count leading zeros circuit 510. Circuit 510, in turn, routes the computed number of leading zeros to an input port of adder 530 and the complement of the number of leading zeroes to an input port of adder 520. The remaining input ports of adders 520 and 530 are in turn supplied with values 31 and 1, respectively. Thus, values at the output ports of adders 520 and 530 are, respectively, the number of leading zeros plus 1 and 31 minus the number of leading zeroes. The first of these values is then routed to a control port of left shifter 550, while the second of these values is supplied to an input port of logic circuit 540. The values stored in register RS1 are provided on an input port of left shifter 550. After shifter 550 has completed a left shift operation, bits 9–31 of an output port of left shifter 550 are stored into the bits of register RD representing the mantissa portion of floating point value fl. The scale factor stored in RS2 is supplied on the remaining input port of subtractor 540. A value on the output port of logic circuit 540 is stored in the bits of register RD representing the exponent portion of floating point value fl. The sign bit s of fixed point value fx is written directly into the sign bit of floating point value fl stored in register RD.

Java is a trademark of Sun Microsystems, Inc. of Mountain View Calif.

Embodiments described above illustrate but do not limit the invention. In particular, the invention is not limited by any number of registers or immediate values specified by the instructions. In addition, the invention is not limited to any particular hardware implementation. Those skilled in the art realize that alternative hardware implementation can be employed in lieu of the one described herein in accordance to the principles of the present invention. Other embodiments and variations are within the scope of the invention, as defined by the following claims.

What is claimed is:

1. A method of executing a single instruction fixed point to floating point conversion operation on a processor, the method comprising:

providing the processor with an opcode indicating a fixed point to floating point conversion instruction;

providing the processor with a fixed point value fx;

providing the processor with a reference to a destination register of the processor;

converting fx into a floating point value fl;

storing fl into the destination register; and providing the processor with a reference to a first source register of the processor, wherein a value s, stored in first source register, indicates how many bits of fx represent an integer part of fx and how many bits of fx represent a factional part of fx.

2. The method of claim 1, further comprising:

providing the processor with a reference to a second source register of the processor, wherein fx is stored in the second source register and has a fixed number of bits.

3. A method of executing a single instruction fixed point to floating point conversion operation on a processor, the method comprising:

providing the processor with an opcode indicating a fixed point to floating point conversion instruction;

providing the processor with a fixed point value fx;

providing the processor with a reference to a destination register of the processor;

converting fx into a floating point value fl; and storing fl into the destination register, wherein the processor is pipelined and the single instruction is executed with a latency of 4 cycles and a throughput of one instruction per cycle.

4. The method of claim 3, further comprising:

providing the processor with a reference to a second source register of the processor, wherein fx is stored in the second source register and has a fixed number of bits.

5. A method of operating a processor comprising:

in response to a single instruction executable by the processor, converting a fixed point value represented in a first source register, to a floating point value, wherein respective integer and fractional parts of the fixed point value are identifiable using a first operand of the instruction.

6. The method of claim 5, wherein the first source register is identifiable by a second operand of the instruction.

7. The method of claim 5, wherein a value representing the integer and fractional parts of the fixed point value is stored in a second source register identifiable by the first operand of the instruction.

8. The method of claim 5, wherein a value identifying the integer and fractional parts of the fixed point value representation is specified as immediate data in the first operand of the instruction.

9. The method of claim 5, further comprising:

storing the floating point value in a destination register identifiable by a third operand of the instruction.

10. The method of claim 9, wherein the source and destination registers are interchangeable.

11. The method of claim 5, wherein the processor is pipelined and the single instruction is executed with a throughput of one instruction per cycle.

12. A Processor comprising:

a plurality of registers;

at least one execution unit configured to convert a fixed point value represented in a first source register to a floating point value in response to a single instruction executable by the processor, wherein respective integer and fractional parts of the fixed point value representation are identifiable using a first operand of the instruction.

13. The processor of claim 12, wherein the first source register is identifiable by a second operand of the instruction.

14. The processor of claim 12, wherein a value identifying the integer and fractional parts of the fixed point value representation is stored in a second source register identifiable by the first operand of the instruction.

15. The processor of claim 12, wherein a value identifying the integer and fractional parts of the fixed point value representation is specified as immediate data in the first operand of the instruction.

16. The processor of claim 12, wherein the execution unit is further configured to store the floating point value in a destination register, identifiable by a third operand of the instruction.

17. The processor of claim 16, wherein the source and destination registers are interchangeable.

18. The processor of claim 16, wherein the processor is pipelined and the execution unit is further configured to execute instructions with a throughput of one instruction per cycle.

19. An apparatus comprising:

a processor;

plural registers accessible to the processor; and means for converting a fixed point value, represented in first one of the registers, to a floating point value, in response to a single instruction executable by the processor, wherein respective integer and fractional parts of the fixed point value representation are identifiable using a first operand of the instruction.

20. The processor of claim 19, further comprising:

means for storing the floating point value in a second register identifiable by a second operand of the instruction.

21. The processor of claim 19, further comprising:

means for executing instructions with a throughput of one instruction per cycle.

22. A processor that executes an instruction set that includes an instruction that upon execution thereof, causes the processor to convert a fixed point value represented in a first source register, to a floating point value, wherein respective integer and fractional parts of the fixed point value representation are identifiable using a first operand of the instruction.

23. The processor of claim 22, wherein the first source register is identifiable by a second operand of the instruction.

24. The processor of claim 22, wherein a value identifying the integer and fractional parts of the fixed point value representation is stored in second source register identifiable by first operand of the instruction.

25. The processor of claim 22, wherein a value representing the integer and fractional parts of the fixed point value representation is specified as immediate data in the first operand of the instruction.

26. The processor of claim 22, wherein upon execution thereof, the processor stores the floating point value in a destination register identifiable by a third operand of the instruction.

27. A computer program product including software for execution as at least one thread on a processor that executes an instruction set that includes a fixed-to-float instruction that upon execution thereof, causes the processor to convert a fixed point value represented in a first source register, to a floating point value, wherein respective integer and fractional parts of the fixed point value representation are identifiable using a first operand of the instruction; the computer program product comprising:

at least one instance of the fixed-to-float instruction.

* * * * *